United States Patent [19]
Iida et al.

[11] 3,754,817
[45] Aug. 28, 1973

[54] APPARATUS FOR RETRIEVING FILM SHEETS

[75] Inventors: Takeo Iida, Setagayaku, Tokyo; Shiro Toriumi, Nerimaku, Tokyo; Masahiro Yamamoto, Shinagawaku, Tokyo; Hiroshi Endo, Fuchu, Tokyo, all of Japan

[73] Assignee: Minolta Camera Kabushiki Kaisha, Osaka-fu, Japan

[22] Filed: Nov. 3, 1971

[21] Appl. No.: 195,159

[52] U.S. Cl. .................................. 353/27, 353/120
[51] Int. Cl. ...................... G03b 23/08, G03b 21/00
[58] Field of Search .......................... 353/25, 26, 27; 340/17.25; 40/78.05

[56] References Cited
UNITED STATES PATENTS
| | | | |
|---|---|---|---|
| 3,566,524 | 3/1971 | Irasek | 40/78.05 |
| 2,620,389 | 12/1952 | Potter | 274/4 R |
| 3,704,451 | 11/1972 | Pearson | 353/25 |
| 3,288,024 | 11/1966 | Crouquist | 353/26 |
| 3,124,260 | 3/1964 | Tidball | 353/25 |

*Primary Examiner*—Louis R. Prince
*Assistant Examiner*—A. J. Mirabito
*Attorney*—Stanley Wolder

[57] ABSTRACT

A retrieval apparatus comprises a lifter carrying an unloadable cassette in the form of a rectangular box containing a great number of film sheets, a retrieving mechanism for selecting and taking out a film sheet from the cassette in operative relation to the upward movement of the lifter, a positioning mechanism for receiving the selected film sheet from the retrieving mechanism by way of a delivery mechanism and setting the desired frame of the film sheet at the projecting position in accordance with a signal instruction, and a returning mechanism for returning the film sheet into the cassette after completion of projection. After the cassette is placed on the lifter, the opening of the lid of the cassette, selection and positioning of the film sheet, projection, and returning the film sheet into the cassette are all conducted automatically.

12 Claims, 17 Drawing Figures

Patented Aug. 28, 1973

By *Stanley Webber*
Attorney (A)       (B)

Patented Aug. 28, 1973 3,754,817
7 Sheets-Sheet 4
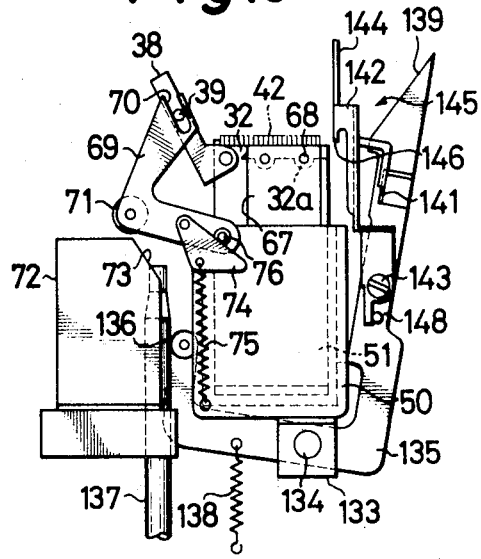
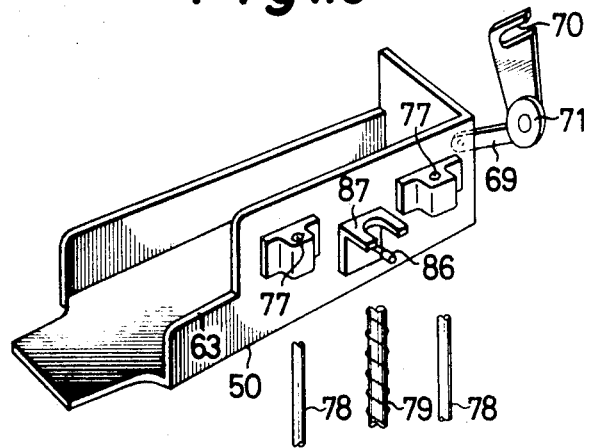
By Stanley Wolder
Attorney

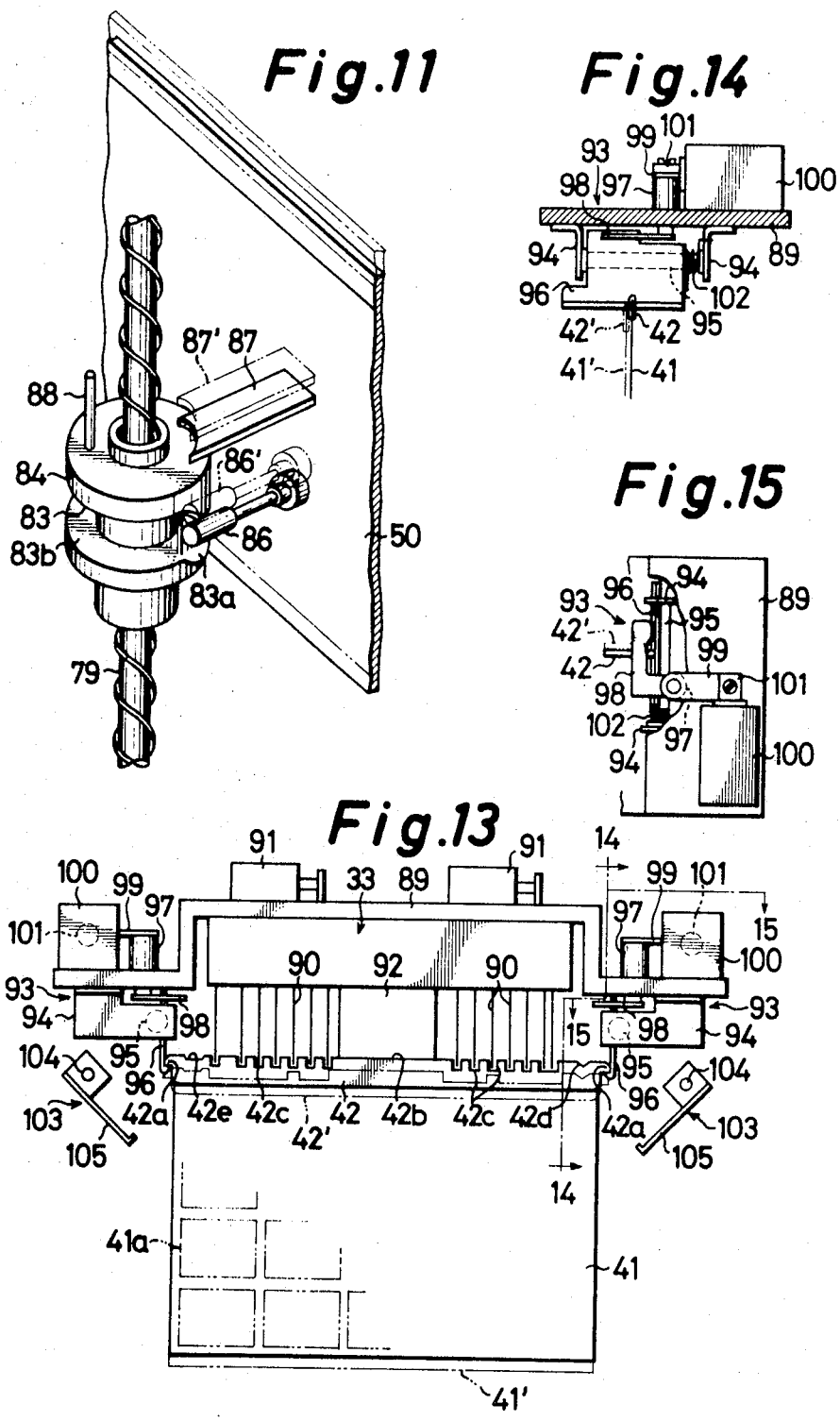

APPARATUS FOR RETRIEVING FILM SHEETS

BACKGROUND OF THE INVENTION

The present invention relates to an apparatus for retrieving film sheets, more particularly to a film sheet retrieving apparatus whereby the desired information recorded on a frame of film sheets contained in a cassette is selected and enlarged and projected for reading and copying purposes. Usually, a film sheet is divided into several tens of frames to record information, literature or the like in each frame and several tens of such film sheets are placed in a cassette for storage.

At present an enormous amount of information, literature and records are made available every day and it requires much labor to collect, classify and utilize such information. Storage of information and literature further needs a large space. In order to overcome these problems, it is practiced to record information and literature in the form of a microfilm. With this system, it is necessary to quickly select and take out the desired microfilm in using the information recorded thereon. For this purpose, it is known to microfilm the information or literature in each of tens of frames on a film sheet, to provide each of such film sheets with a metal clip having a peculiar selecting code, and to store hundreds of such film sheets in a rotor in a radial arrangement. To reproduce the information, the rotor is set on a retrieval projector and the desired film sheet is selected and taken out by depressing a push button and the information is projected for reading or copying. The film is then returned to the original position in the rotor.

However, it is noted that since the rotor is in the form of a cylinder and the film sheets are placed therein in a radial arrangement, the above-mentioned apparatus has the drawback that, whereas the film sheets are in fitting contact with each other at the center of the rotor, considerable clearances are produced between adjacent film sheets along the outer periphery of the rotor. Accordingly, the rotor is not fully utilized along its periphery or requires an excess space along its periphery, with the result that the rotor itself becomes large and requires a greater retrieval projector.

Furthermore, in storing a great number of rotors in an orderly arrangement, for example by piling them up in the form of a cylinder or placing them on shelves, they require a useless space because of its circular form and are therefore inconvenient to arrange in orderly manner. Thus, the apparatus of the rotor type is very disadvantageous from the viewpoint of effective use of space.

SUMMARY OF THE INVENTION

An object of the present invention is to provide a retrieval apparatus wherein a great number of film sheets each having a metal margin fixed to one side of the sheet and formed with a selecting code are contained in a rectangular box, the desired film sheet can be selected and drawn out from the cassette automatically by depressing a button, the desired record on the selected film sheet is then set on the projector, and the film sheet is returned into the cassette after projection.

Another object of this invention is to provide a compact retrieval projector incorporating therein a retrieval apparatus which requires the smallest possible space so as to give the greatest space to the projector and to thereby permit projection with a greater magnification.

Another object of this invention is to provide a safety device for unloading the cassette whereby the door for loading the cassette is locked during the period when the film sheet is selected and taken out, the desired frame is positioned and projected and the film sheet is returned to the cassette within the retrieval projector.

Another object of the present invention is to provide a mechanism which permits the cassette to be loaded on a lifter at the cassette loading station with the lid of cassette closed and which opens the lid during the upward travel of the lifter and closes the lid during the downward travel thereof.

Another object of this invention is to provide a simple mechanism which effects rapid upward travel of the lifter and which is capable of reducing the inertia at the time when the lifter is brought to a halt from the upward travel.

Still another object of this invention is to provide a mechanism which automatically forms a space for receiving the film sheet in the cassette when it is to be returned into the cassette after completion of projection so as to ensure easy and reliable insertion of the film sheet without causing possible damage to the film sheet during insertion.

In accordance with the present invention, there is provided a retrieval projector including a projector housed in a main frame and having a projecting light source, lenses, a mirror, projector screen, etc., an operating portion disposed in the front portion of the main frame and having code selecting push buttons, a forward button, switches, etc., and a retrieval apparatus. The retrieval apparatus is characterized in that it incorporates a cassette in the form of a rectangular box disposed at one side of the frame and containing a number of film sheets each equipped with a coding metal margin fixed to one side of the sheet whereby a film sheet having the desired record is selected and taken out from the cassette in accordance with the signal instruction emitted by depressing the code selecting push button.

The retrieval apparatus comprises a door for loading the cassette into the main frame or unloading the same therefrom; a lifter having a drawer-like box for carrying the cassette at a predetermined position and to be moved upward and downward after the cassette is set in place in response to signal instructions emitted by the code selecting push button and forward button; a retrieving mechanism for electromagnetically attracting the metal margin of the desired film sheet in the cassette at the terminal position of upward movement of the lifter in response to the signal instruction and drawing out the same from the cassette as the lifter moves downward; a delivery mechanism for temporarily holding the film sheet after it has been drawn out by the retrieving mechanism and delivering the same to a positioning mechanism; a positioning mechanism for setting a frame of the film sheet having the desired record at the projecting position in accordance with the signal instruction of the code selecting push button and returning the film sheet to the original delivery position in response to the signal instruction of the forward button; and a returning mechanism provided for the lifter for returning the film sheet from the positioning mechanism into the cassette upon completion of projection.

Thus in accordance with the invention, by operating the code selecting push button and forward button after the cassette is loaded on the apparatus and the door is closed, the film sheet having the desired record can be selected and taken out in a full automatic operation, the record is then set on the projection by the positioning mechanism, and the film sheet is returned to the cassette after completion of projection.

The door is so constructed that it is electromagnetically locked, at the latest, by the time the code selecting push button is operated and is held in a locked state until the cassette is returned to the cassette. The lid of the cassette is opened by lid opening and closing means on the lifter in operative relation to the upward travel of the lifter and is closed as the lifter moves down. Accordingly, the operations including drawing out of the film sheet and returning the same into the cassette are all performed within the interior of the apparatus with the door held in locked state until all the operations are completed, so that there is no possiblity of the selected film sheet being misplaced into another cassette, thus eliminating the trouble of classification or rearrangement.

Since the foregoing lifting mechanism is equipped with guide means for forming a space to insert the film sheet in within the cassette when the film sheet is to be returned into the cassette and guiding the film sheet into the space, the surfaces of the film sheets can be protected from defacement during placement.

The cassette of this invention which is in the form of a rectangular box assures the ease of arrangement and storage and a great number of cassettes can be piled up or aligned in a small space. The arrangement wherein the selection and drawing out of the film sheet are effected in operative relation to the vertical movement of the cassette serves to substantially reduce the space required for the retrieving mechanism and the positioning mechanism and enables the projector to utilize the greatest possible space for an enlargement with a still greater magnification. The foregoing structure is further useful in providing a compact retrieval projector.

Other objects and advantages of the present invention will become more apparent from the following description.

Brief Description of the Drawings

FIG. 8 is a rear view showing a mechanism of the lifter for opening and closing the lid of the cassette and a mechanism for returning a film sheet to the cassette;

FIG. 10 is a perspective view showing the principal part of the lifter;

FIG. 11 is a perspective view showing the principal part of a lifting mechanism for the lifter;

FIG. 13 is a side elevation showing a retrieving mechanism;

FIG. 14 is a front view taken along the line 14—14 in FIG. 13;

FIG. 15 is a plan view taken along the line 15—15 in FIG. 13;

DESCRIPTION OF THE PREFERRED EMBODIMENT

Figure 1:
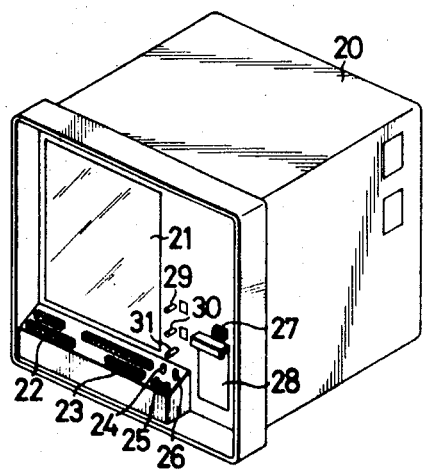
FIG. 1 is a perspective view showing the external appearance of a retrieval projector embodying the present invention.
Figure 2:
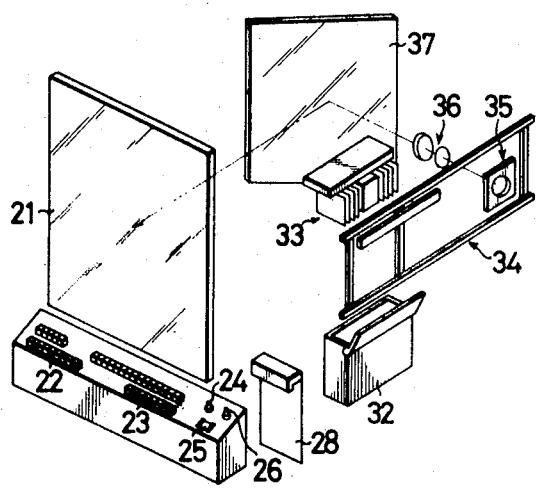
FIG. 2 is a diagram showing the interior arrangement of the same.

A retrieval projector embodying the present invention is shown in FIGS. 1 and 2 wherein a boxlike frame 20 has in its front face a screen 21 made of a semitransparent plate or the like and at its lower portion code selecting push buttons such as sheet selecting buttons 22, frame selecting buttons 23, etc., a main switch 24, a pilot lamp 25, a forward button 26, and an indicating lamp 27. At one side of lower portion of the frame, a door 28 for loading cassettes is formed, and fine adjustment knobs 29, 30 and a focusing knob 31 are disposed. The frame 20 houses therein a lifting mechanism for cassettes 32 to be described later, a retrieving mechanism 33, a positioning mechanism 34, a projector 35, projector lenses 36, a mirror 37, unillustrated illuminating light source for projection and the like, whereby the immage on a film sheet set on the projector 35 is enlarged and projected onto the screen 21.

Figure 3:
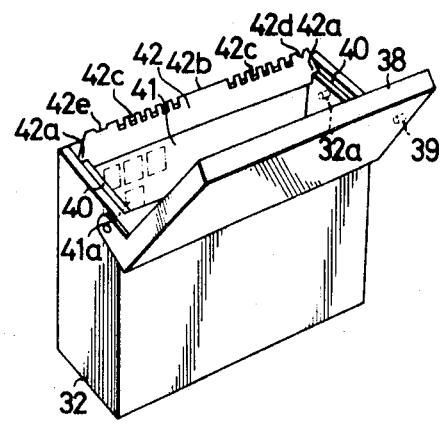
FIG. 3 is a perspective view showing the construction of a cassette to be employed in the present invention.

As seen from FIG. 3, the cassette 32 is in the form of a rectangular box and has a hinged lid 38 which is provided on its rear face with a pin 39 for engagement with a lid opening lever on a lifter to be described later. Further the cassette box is formed in its rear face with a recess 32a to be engaged with a pin on a cassette loader for identifying the front or the rear of the cassette. The cassette 32 is formed in the front and rear edges of its opening with stepped portions 40 for engagement with metal margins 42 of film sheets 4 for the selection of the sheet.

The film sheet 41 is divided into a great number of frames 41a on which information, literature, etc. are recorded in the form of a microfilm. The metal margin 42 for selecting the film sheet 4 is fixed to one side thereof and has ears 42a at its opposite ends and, at the midportion of the upper edge, an edge 42b to be attracted by an electromagnet of the retrieving mechanism for drawing out the sheet. Formed on the opposite sides of the edge 42b are coding notches 42c peculiar to each sheet, a V-Shaped notch 42d for determining the position relative to the positioning mechanism and a shallow notch 42e for holding purpose.

Figure 4:
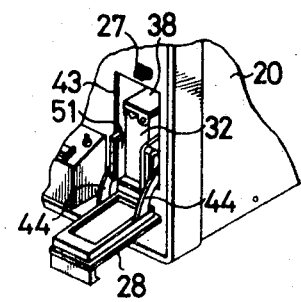
FIG. 4 is a perspective view showing the door for a cassette loading opening in the retrieval projector.
Figure 5:
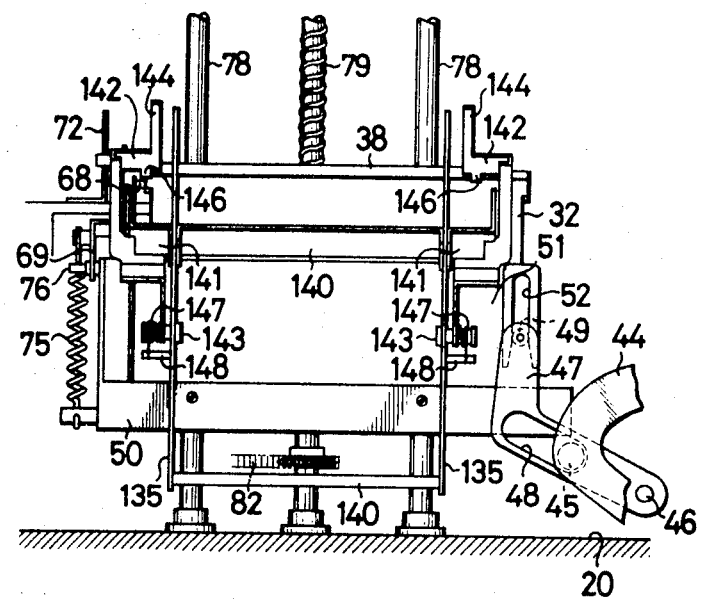
FIG. 5 is a side elevation showing a lifter carrying thereon the cassette.

As shown in FIGS. 4 and 5, the door 28 through which the cassette 32 is put into or taken out of the frame 20 is pivotally supported at the lower portion inside the opening 43 of the frame 20 by extendible plates 44 extending into the frame and disposed at the opposite sides of the door 28. A pin 45 (or a roller) on the plate 44 is engaged in a slot 48 in a lever 47 pivoted at its one end to a pin 46 within the interior of the frame 20. A pin 49 (or a roller) at the distal end of the lever 47 is engaged in a vertical groove 52 in the side face of a box 51 slidable on the lifter 50 backward or forward, the groove 52 being open at its lower end.

When the door 28 is opened as seen in FIG. 4, the pin 45 on the plate 44 causes the lever 47 to move clockwise in FIG. 5 about the pin 46, with the result that the pin 49 pulls out the box 51 on the lifter 50 to the front of the frame while sliding in the groove 52 of the box 51. Since the lever 47 is pivoted at its base portion to the frame 20 with the pin 49 at its distal end engaged in the vertical groove 52 and receives the pin 45 on the plate 44 in its intermediate slot 48, the movement of the box 51 relative to the distance of movement of the pin 45 during the opening or closing of the door 28 is increased, so that when the door 28 is opened, the box 51 can be pulled out a sufficient distance toward the front of the frame 20, thus facilitating the procedure to place the cassette 32 on the box 51.

Figure 6:
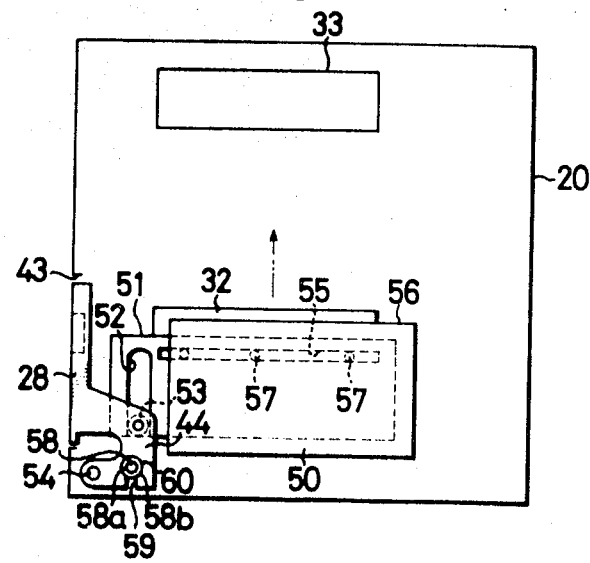
FIG. 6 is a view showing the arrangement of the door and the lifter.
Figure 7:
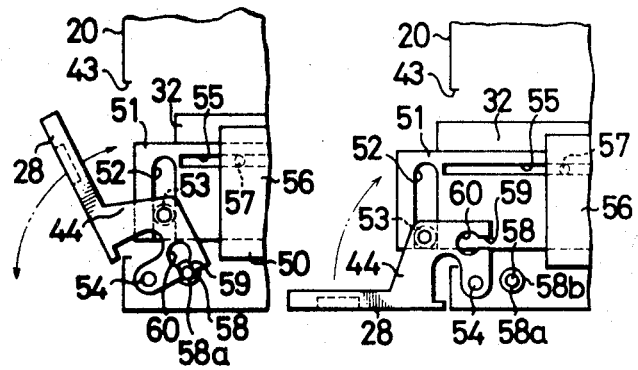
FIGS. 7A and 7B are views illustrating the operation of the door and a mechanism for locking the door.

Alternatively, the operative relation between the door 28 and the box 51 can be achieved by an arrangement as shown in FIGS. 6, 7A and 7B wherein the roller 53 on the plate 44 of the door 28 is directly engaged in the vertical groove 52 of the box 51 which is open-ended at its lower portion. As illustrated in FIG. 7, this arrangement enables the box 51 to move slidably on the lifter 50 in operative realtion to the opening or closing of the door 28 about the pivot 54 fixed to the interior of the frame for the ease of loading of the cassette 32. Further the box 51 is formed in its side face with an illustrated horizontal groove 55 in which a pin 57 extending from the side plate 56 of the lifter 50 is engaged so as to guide the sliding movement of the box on the lifter 50 and thereby prevent the disengagement of the box from the lifter 50.

The lower portion inside the opening 43 of the frame 20 further includes a stepped rod 58 extending transversely of the frame and adapted to be moved in its axial direction by electromagnetic means as seen in FIGS. 6 and 7. In the lower edge of the extendible plate 44 of the door 28, there is formed a cutout 59 engageable with a small diameter portion 58a of the stepped rod 58. The cutout 59 communicates at its upper end with a hole 60 and is engageable with a large diameter portion 58b of the rod 58.

The stepped rod 58 is adapted to be moved in its axial direction by electromagnetic means or similar mechanically operatable means, the electromagnetic means being energized upon closing of the main switch 24 or, at the latest, upon depression of the code selecting push-buttons 22, 23 and de-energized upon completion of the downward movement of the lifter 50 after the film sheet has been placed back into the cassette. While the electromagnetic means is in the unenergized state, the small diameter portion 58a is located at the position of the open groove 59, and upon energization the rod 58 is moved to have its large diameter portion 58b engaged into the hole 60.

Thus the door 28 is opened and closed to load the cassette 32 into the frame 20. When the cassette 32 is to be taken out of the frame 20 after selection, drawing out, projection and placement of the sheet film, the small diameter portion 58a of the rod 58 is located at the position of the groove 59 of the extendiable plate 44 for the door 28 as seen in FIG. 7 to permit the opening and closing of the door 28, but during the operations of selection, projection and returning with the main switch in the closed position, the large diameter portion 58b of the rod 58 remains engaged in the hole 60 as seen in FIG. 6 until the completion of all of these operations. Since the width of the open groove 59 is smaller than the diameter of the large diameter portion 58b, the door is prevented from closing. This locking state is indicated by the lamp 27.

Figure 9:
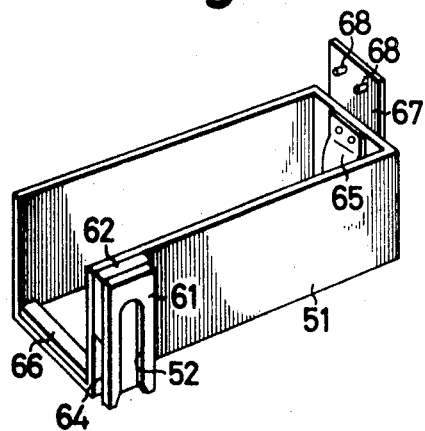
FIG. 9 is a perspective view showing a cassette carrying box.

The box 51 for carrying the cassette, shown in greater detail in FIGS. 8 and 9, is oen at its front and has walls on three sides. A plate 61 formed with the vertical groove 52 is fixed to one side wall with a base plate 62 interposed therebetween. The lower portion of the base plate 62 has a slit 64 for engagement with a cutout 63 in the side plate of the lifter 50 shown in FIG. 10. A plate spring 65 is fixed to the inner face of the rear side wall, and a stopper 66 is provided on the front end of the bottom plate. The position of the cassette is determined by the spring 65 and the stopper 66. Extending upward from the rear side wall is a plate 67 from which projects pin 68 for identifying the front or rear of the cassette 32, the pin 68 being engageable into the recess 32a in the cassette 32. The vertical groove 52 is flared at its lower end so as to facilitate the engagement of the pin 49 or roller 53 into the vertical groove 52 during the upward or downward movement of the lifter 50.

When the cassette 32 is placed on the box 51, the pin 68 engages in the recess 32a in the rear face thereof to identify the front or rear of the cassette and the plate spring 65 pushes the cassette 32 to cause the under edge of its front end to press against the stopper 66. The cassette is therefore brought to the correct position. If the cassette is loaded reversely longitudinally thereof, the pin 68 will prevent the cassette 32 from fitting to the position defined by the stopper 66. The pin 68 thus serves to identify the front or the rear of the cassette. Electrical means is further provided which does not permit the following operations if the cassette is not placed in the correct position.

As already described, the box 51 is placed on the lifter 50 in longitudinally slidable manner as shown in FIG. 10.

It will be seen from FIGS. 8 and 10 that the base portion of an L-shaped lid opening and closing lever 69 is pivoted to the rear of the lifter 50, the distal end of the lever 69 being formed with an elongated groove 70 to be engaged with the pin 39 on the rear face of the lid 38 of the cassette 32. A roller 71 is pivoted to the bent portion of the lever 69. To bring the roller 71 into contact with the cam face 73 of the cam plate 72 fixed to the frame 20 during the up and down movement of the lifter 50, the lever 69 is subjected to the action of a spring 75 fixed at its one end to the lifter 50 by way of a stopper plate 74, which as seen in FIG. 8 has its one side always in engagement with the pivot 76 of the lever 69 under the action of the spring 75 so as not to permit the lid 38 to open to excess.

When the cassette 32 is placed on the box 51 and the door 28 is closed, the box 51 is pushed to a predetermined position on the lifter 50, and the pin 39 on the rear face of the lid 38 of the cassette 32 engages in the elongated groove 70. (In this state, the roller 71 in FIG. 8 is in engagement with the vertical portion below the cam face 73 and the lever 69 has been pivotally moved rightward in FIG. 8, with the lid 38 in closed position and the pin 39 engaged in the elongated groove 70.) As the lifter 50 moves upward, the spring 75 causes the roller 71 to move along the cam face 73, so that the lever 69 rotates in a counterclockwise direction in FIG. 8 about the pivot 76. Upon termination of the upward movement, the lid 38 is opened as seen in FIG. 8, whereas the downward movement of the lifter 50 causes the lever 69 to rotate in a clockwise direction until the lid 38 of the cassette 32 is closed upon termination of the downward movement. The stopper plate 74 which has its one end always in contact with the pivot 76 under the action of the spring 75 acts to prevent excess opening of the lid 38 at the terminal of the upward movement of the lifter 50.

Figure 12:
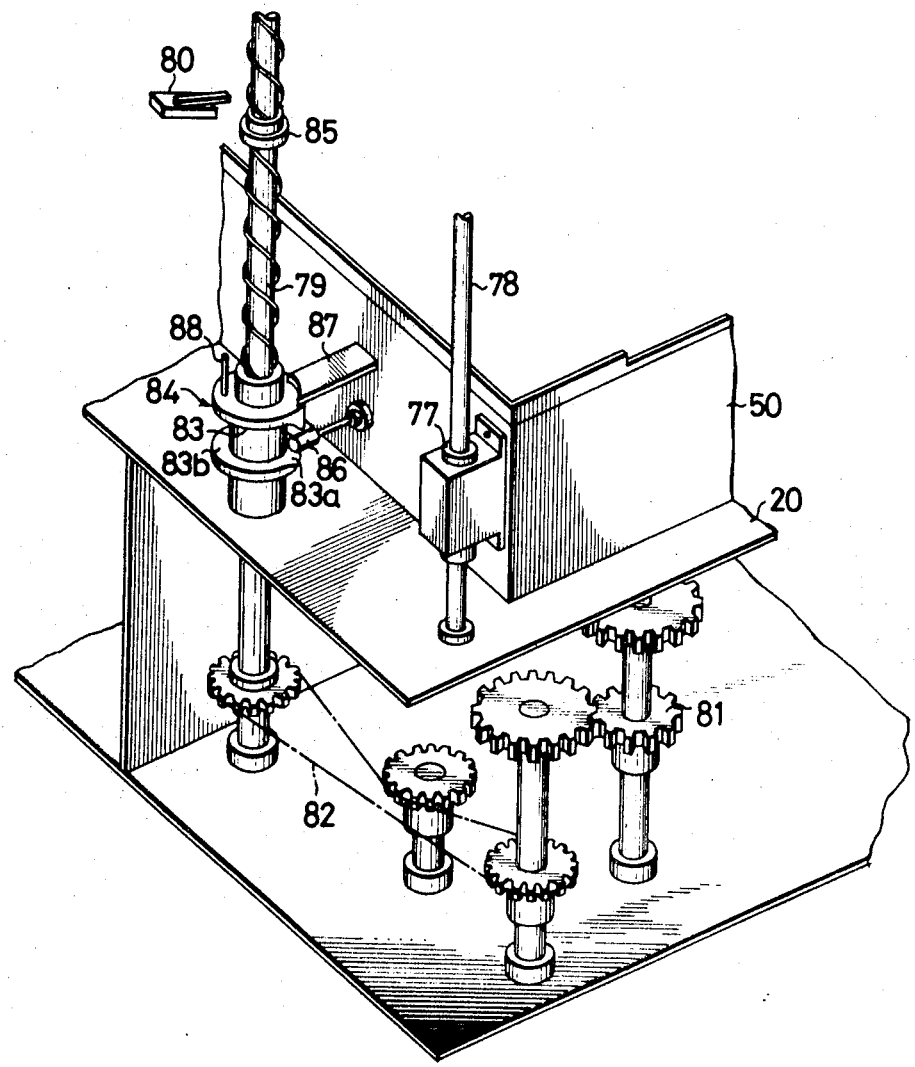
FIG. 12 is a perspective view showing the lifting mechanism for the lifter.

The lifting mechanism for the lifter 50 is shown in FIGS. 10, 11 and 12 wherein guide bars 78 fixed to the frame 20 in a vertical direction pass through bushes 77 fixed to the side face of the lifter 50 to guide the vertical movement. The frame 20 is further provided with a threaded rod extending upright in rotatable manner and formed with helicoid with a large pitch, the threaded rod being adapted to be driven both in normal and reverse directions by drive means through gear means 81, sprocket transmission means 82, etc., the drive means being adapted to be driven in a normal direction in response to the retrieval instructing signal and to be reversely driven by the operation of a microswitch 80 at the upper terminal position for the lifter 50. Further a lifting member 84 formed with a groove cam 83 having a lower portion 83a is screwed on the threaded rod 79. A stop ring 85 is secured to the threaded rod 79 to define the terminal of the upward movement of the lifter 50.

The lifter 50 is formed on its side face with a roller 86 engaging in the grooved cam 83 and an arm 87 to be brought into engagement with the upper face of the lifting member 84 to exert a frictional force thereon when the roller 86 is positioned on the lower portion of the groove cam 83 and to be released from the upper face of the lifting member 84 when the roller 86 is positioned on the higher portion 83b of the groove cam 83. A pin 88 on the lifting member 84 actuates the microswitch 80.

More specifically, when the drive means operates in response to a retrieval instracting signal to drive the threaded rod 79 in a normal direction, the roller 86 of the lifter 50 is located on the lower portion 83a of the groove cam 83 with the arm 87 in contact with the upper face of the lifting member 84. Since a high frictional force is exerted by the arm 87 on the lifting member 84 due to the gravity on the lifter 50, the lifting member 84 is prevented from rotation, with the result that the lifting member 84 is pushed upward by the helicoid of the threaded rod 79. Thus the lifter 50 is moved upward along with the lifting member 84.

Just before the lifter 50 reaches the uppermost position, the lifting member 84 comes into contact with a stop ring 85 and is prevented from further upward movement. The lifting member 84 therefore rotates overcoming the frictional force and causes the groove cam 83 to push the roller 86 from the lower portion 83a to the upper portion 83b as indicated in phantom lines 83' and 87' in FIG. 11 to thereby push up the lifter 50 to a predetermined position, whereupon the pin 88 hits the microswitch 80 to operate the same to drive the drive means in the reverse direction.

When the drive means is driven in the reverse direction, the rotation of the lifting member 84 brings the roller 86 to the lower portion 83a of the groove cam 83 again and the lifter 50 descends a corresponding amount to permit the arm 87 to come into frictional contact with the upper face of the lifting member 84 and thereby prevent the rotation of the lifting member 84. Thus the lifting member 84 is lowered along with the lifter 50 to actuate the unillustrated switch at the terminal position of its downward movement to stop the drive means.

Due to the construction that the slope of the groove cam 83 is smaller than the helicoid, the arrangement that the lifting member 84 is rotated just before it is brought to a halt at the terminal position of the upward movement of the lifter 50 serves to suitably decrease the speed of elevation effected by the helicoid and thereby mitigate the inertia of the lifter 50 when it stops at the terminal position. This prevents the cassette 32 from being forced out upward under the inertia or the film sheet 41 from getting out of the cassette 32 due to the inertia. In this way the foregoing arrangement achieves shock absorption at the time of stopping. Accordingly, the shock to be produced at the time the cassette is stopped from its upward movement can be reduced without employing, for the drive means, complex means such as a reduction gear system comprising several gears from controlling the speed of elevation of the lifter. It is also possible to drive the threaded rod 79 directly by a reversible motor.

Although it may possibly be presumed that a clamping force will act between the threaded rod 79 and the lifting member 84 when the lifting member 84 hits the stop ring 85 at the terminal position of its upward movement, there is no such possibility since the lead of the helicoid is great, and the lifting member 84 is initiated into downward movement very smoothly when the drive means is driven in the reverse direction.

In corresponding relation to the terminal position of upward movement of the lifting mechanism, there is disposed a retrieving mechanism 33 as shown in FIGS. 13, 14 and 15. The retrieving mechanism 33 is positioned on a base plate 89 on the frame. The retrieving mechanism 33 comprises a great number of selector plates 90 having a lower end to be engaged in the notch 42c of the metal margin 42 of the film sheet, electromagnets 91 for shifting the selector plates 90 into engagement with the coding notches 42c in accordance with the signal instruction of the sheet selecting button 22, an electromagnet 92 for attracting the edge 42b of metal margin 42 of the film sheet 41 selected by the selector plates 90, and clamp means 93 for temporarily holding the film sheet 41 in engagement with the ears 42a at the opposite ends of metal margin thereof.

More specifically, the selector plates 90 are disposed both in front and rear of the electromagnet 92 in an equal number and have lower ends extending downward beyond the attracting surface of the electromagnet 92 a distance approximately corresponding to the depth of the notch 42c of the metal margin 42. Although not shown, the lateral width of the lower end of the plate 90 corresponds to that of the cassette 32. The selector plates 90 are movable forward or backward, i.e. sidewise in FIG. 13, by the electromagnets 91 to be operated by signal instruction of the sheet selecting buttons 22 so that the lower edges of all the selector plates 90 can be brought into the notches 42c of the only one film sheet 41 to be selected. In spite of the attraction of the electromagnet 92, the nonselected film sheets are prevented from the upward movement by virtue of the fact that the lower edge of at least one selector plate 90 will not fit into the notches 42c of the nonselected sheets.

A great number of film sheets 41 placed in one cassette 32 have selection codes each peculiar to each film sheet in that they differ from one another in the position and number of the notches 42c formed in the metal margins thereof, the arrangement being such that the selection code corresponding to one retrieval instructing signal is peculiar to only one film sheet. The selector plates 90 are shiftable by the electromagnets 91 and in this arrangement it is preferred that at at least one position in front and rear of the electromagnet 92 respectively, nonselected film sheets be prevented from elevation against the attraction of the electromagnet 92. For this purpose, each of the selector plates 90 in front of the electromagnet 92 and each of those in rear of the electromagnet 92 are connected by unillustrated plate or the like so that each pair of the front and rear selector plates 90 will be moved in operative relation by the shifting action of the electromagnets 91.

When a retrieval instruction signal is emitted by depression of the sheet selecting button 22, the electromagnets 91 are operated to shift all the selector plates 90 to the position corresponding to the selecting code. When the lifter 50 is moved to the highest position, the electromagnet 92 is energized to exert an electromagnetic force on the metal margins 42 within the cassette 32. Since the sheet retrieving instruction signal emitted by the depressed sheet selecting button 22 corresponds to the code on the metal margin 42 of only one film sheet 41 within the cassette and the selection codes on the other film sheets do not correspond to the signal instruction, only the metal margin 42 with notches 42c engageable with the lower edges of all the selector plates 90 is attracted by the electromagnet 92 as shown in a solid line in FIG. 13. The clamp means 93 clamps the selected film sheet 41, and the other film sheets are prevented from being attracted to the electromagnet 92 and retained in the cassette 32 by at least one pair of the selector plates 90 in front and rear of the electromagnet 92 as indicated in phantom lines 41' and 42' in FIG. 13. The de-energization of the electromagnet 92 and the lowering of the cassette 32 on the lifter 50 permit the only one film sheet 41 attracted to the electromagnet 92 to be drawn out from the cassette 32, with the other film sheets retained in the cassette 32 and lowered.

In the foregoing construction, the clamp means 93 serves to temporarily retain the film sheet 41 after de-energization of the electromagnet 92. During the upward movement of the lifter 50, the lower ends of the clamp plates 96 are in an open position so as not to interfere with the upward movement of the lifter 50. After energization of the electromagnet 92, the clamp means 93 clamps the ears 42a of the selected metal margin 42.

As shown in FIGS. 13, 14 and 15, the clamp means 93 includes a pair of rotatable transverse rods 95 supported on brackets 94 fixed to the front and rear ends of the base plate 89, namely in front and rear of the row of the selector plates 90 respectively. Clamp plates 96 having a width corresponding to the width of the cassette 32 are secured to the rotatable transverse rods 95 respectively. The clamp plate 96 has a hooked lower edge engageable with the under edge of ear 42a of the metal margin 42 of the sheet film 41. Rotatable vertical pivots 97 extend through the base plate 89. A pusher 98 is secured to the lower end of each of the vertical pivots 97. The distal end of the pusher 98 is in contact with the upper end of the clamp plate 96, the arrangement being such that the rotation of the vertical pivot 97 turns the clamp plate 96 about the transverse rod 95 so that the clamp plate 96 is engaged with or disengaged from the ear 42a of the metal margin. Secured to the upper end of the vertical pivot 97 is an arm 99 whose distal end is connected to the actuator 101 of a solenoid 100. Between the transverse rod 95 and the bracket 94 there is a spring 102 acting on the clamp plate 96 in such direction that the clamp plate 96 will be disengaged from the ear 42a at each end of the metal margin 42.

The solenoids 100 are energized before the electromagnet 92 is de-energized to thereby rotate the pushers 98 about the rotatable vertical pivots 97 and cause the same to push the upper ends of the clamp plates 96, whereby the clamp plates 96 are rotated about the transverse rods 95 against the action of the springs 102. The hooked lower ends of the clamp plates 96 are therefore brought into engagement with the ears 42a at the opposite ends of the metal margin 42 as shown in FIG. 13 to temporarily support the film sheet 41 at the position where it is suspended by the electromagnet 92. When the electromagnet 92 is de-energized, the lifter 50 is moved down.

When the lifter 50 starts to move down, the receivers of a delivery mechanism 103 to be described later are positioned below the clamp means 93, and the de-energization of the solenoids 100 of the clamp means 93 permits the clamp plates 96 to move away from each other in FIG. 13 to transfer the film sheet 41 onto the delivery mechanism 103. In this way, the clamp means 93 transfers the selected film sheet 41 from the retrieval mechanism to the delivery mechanism smoothly and rapidly.

Figure 16:
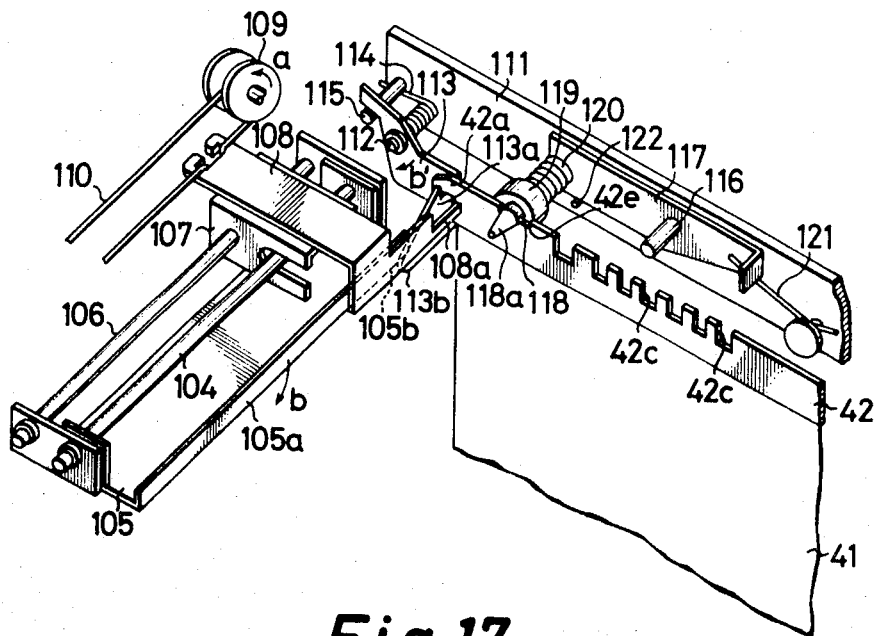
FIG. 16 is a perspective view showing the principal parts of a delivery mechanism and a positioning mechanism.

As illustrated in FIGS. 13 and 16, the delivery mechanism 103 comprises receivers 105 fixed to pivots 104 transversely disposed below the clamp means 93 and having a width corresponding to the lateral width of the cassette 32, sliders 107 slidable on the pivots 104 and rods 106 parallel to the pivots 104, pushing plates 108 each having a pushing edge 108a movable along the upright edge 105a of the receiver 105, ropes 110 (or belts, chains or the like) each passed around guide means such as pulleys 109 and adapted to be moved in the direction of an arrow a upon the downward movement of the lifter 50 and to be moved in the reverse direction during the upward movement of the lifter 50 for reciprocation, each of the ropes carrying the pushing plate 108 fixed thereto so as to reciprocate the same in operative relation to the upward and downward movements of the lifter 50, and a holder 111 for receiving the film sheet 41 from the receivers 105 on which it is pushed forward by the pushing plates 108. The pivots 104 are operated electromagnetically or mechanically so that during the elevation of the lifter 50, the pivots 104 will shift the receivers 105 to the position shown in FIG. 13, the pivots 104 further being so adapted that they shift the receivers to the position shown in FIG. 16 when the lifter 50 starts to move down. During the downward movement of the lifter 50, the metal margin 42 of the film sheet 41 supported on the edges 105a of the receivers 105 is pushed toward the holder 111 by the pushing plates 108 driven by the ropes 110. The pushing plates are retracted during the elevation of the lifter 50.

Figure 17:
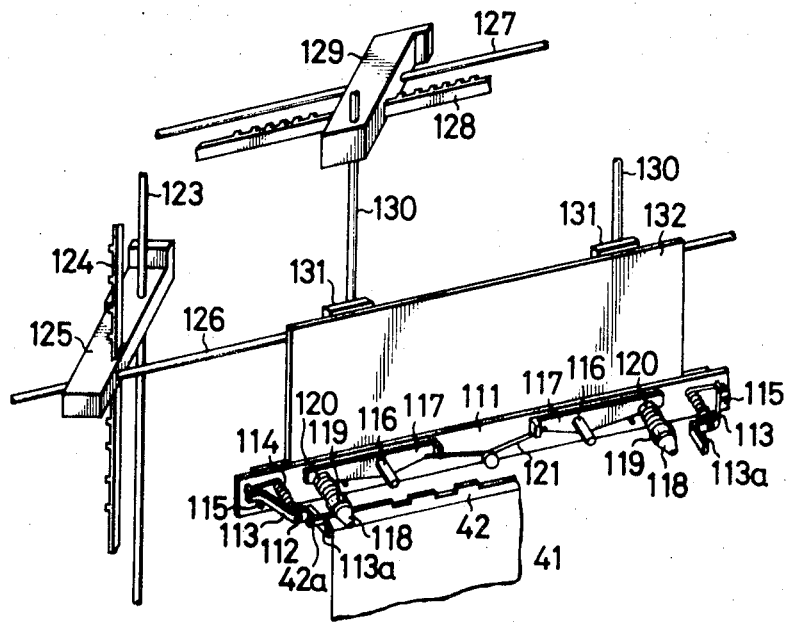
FIG. 17 is a perspective view showing the principal part of the positioning mechanism.

As shown in FIGS. 16 and 17, the holder 111 is provided, at the opposite ends of the side face thereof, with pins 112 to which are pivoted holding plates 113 extending toward the receivers 105 and having distal ends 113b positioned under the ends 105b of the receivers 105 and upper hooked portions 113a. A spring 114 acts on each of the holding plates 113 to urge the hooked portion 113a upward. The position of the latch plate 113 is limited by the stopper 115. Pivoted to the two pins 116 on the side face of the holder are levers 117 whose ends are provided with projections 118 having conical ends 118a. A ring 119 is fitted on the projection 118 and is urged toward the end of the projection 118 by a spring 120. A spring 121 acts on the tail ends of the levers 117 to urge the distal ends thereof downward. The stoppers 122 determine the position of the levers 117. The levers 117 are so positioned that the projections 118 correspond to the V-shaped notch 42d and the notch 42e on the metal margin 42 of the film sheet respectively.

The moment when the metal margin 42 of the film sheet 41 is disengaged from the clamp means 93, the receivers 105 are brought to the horizontal position shown in FIG. 16, and the film sheet thus released drops, whereupon the ears 42a of the metal margin are supported on the upstanding edges 105a of the receivers 105. In operative relation to the downward movement of the lifter 50, the pushing edges 108a of the pushing plates 108 push the metal margin 42 toward the holder 111 and transfer the ears 42a from the edges 105a onto the hooked portions 113a of the holding plates 113. At the same time, the conical ends of the projections 118 of the holder 111 come into engagement with the positioning notch 42d and notch 42e for the holding purpose. Further pushing by the pushing plate 108 of the metal margin 42 permits the ears 42a to engage the hooked portions 108a. With the projections 118 in engagement with the notches 42d and 42e, the spring 121 urges the metal margin 42 downward to assure that the ears 42a are in engagement with the hooked portions 108a. Under the action of the springs 120, the rings 119 are kept in resilient contact with the rear face of the metal margine 42 as seen in FIG. 16 to cause the ears 42a to engage with the hooked portions 108a and thereby assure the retention of the metal margin 42 on the holder 111. The V-shaped notch 42d for positioning the metal margin 42, in engagement with the projection 118 serves to accurately determine the position of the film sheet 41 relative to the holder 111. The notch 42e is formed with a shallow planar portion in the bottom thereof to thereby make up for a small manufacturing error involved in the respective holding members on the side face of the holder 111. In the foregoing arrangement, the springs 114 acting on the holding plates 113 and the spring 121 acting on the levers 117 act on the metal margin 42 in directions opposite to each other, so that one of the springs may be made weaker than the other. The position of the film sheet 41 relative to the holder 11 will then be determined by either one of the stoppers 115 and 122.

The holder 111 serves as a constituent member of the positioning mechanism 35 which is operated electrically along vertical and horizontal members in response to the signal instruction of the frame selecting button 23 so as to position the desired frame of the film sheet on the projector 35.

Referring to FIG. 17, there is shown a vertically movable block 125 slidably mounted on a stationary vertical member 123 and fixed to a vertical belt 124 to be driven a distance corresponding to the vertical movement instructing signal produced by the depression of the frame selecting button 23. The vertically movable block 125 carries a movable horizontal member 126 extending in a horizontal direction. On the other hand, horizontally movable blocks 129 are slidably mounted on a stationary horizontal member 127 and fixed to a horizontal belt 128 to be driven a distance correspoinding to the horizontal movement instructing signal emitted upon depression of the frame selecting button 23. The horizontally movable blocks 129 carry movable vertical members 130 extending in a vertical direction. At the intersections of the movable horizontal member 126 and the movable vertical members 130, there are positioning blocks 131 through which the members 126 and 130 extend. A support 132 fixed to the holder 111 is mounted on the blocks 131.

After the aforementioned delivery operation has been performed, the vertical and horizontal movement instructing signals memorized upon depression of the desired frame selecting button 23 cause the vertical and horizontal belts 124 and 128 to move by amounts corresponding to the instructing signals, with the result that the movable horizontal member 126 and movable vertical members 130 are moved through the movable blocks 125 and 129 to shift the intersections. Thus, the position of the positioning blocks 131 is two-dimensionally controlled (X-Y control) to set the desired frame to the position of the projector 35. By means of unillustrated light source, condenser lens (not shown), projector lenses 36 and mirror 37, the record on the frame is projected onto the screen 21 for reading or copying. At this time the fine adjustment knobs 29, 30 are of course used to adjust the position of the frame on the projector 35 both in vertical and horizontal directions and the focusing knob 31 is used to obtain a distinct image on the screen 21. When another frame in the same film sheet 41 is to be read or copied, a frame selecting button 23 corresponding to the desired frame is depressed after the completion of projection, whereupon the pertinent vertical and horizontal movement instructing signals move the positioning blocks 131 to bring the desired frame to the set position on the projector 35.

After the completion of projection, the forward button 26 is depressed, and the vertical and horizontal belts 124, 128 are driven in the directions opposite to the previous directions in response to the resulting signals to bring the positioning mechanism 34 back to the position for transfer to the delivery mechanism. The film sheet on the holder 111 is therefore returned to the interior of the cassette 32 on the lifter 50.

In returning the film sheet 41 to the cassette 32, there is a need to avoid a possible defacement of the film sheet due to the contact between the film sheets. For this purpose, there is provided a returning mechanism for pushing a number of film sheets 41 in the cassette 32 to one side thereof to form an enlarged space for inserting the film sheet on the holder 111 and guiding the film sheet to be returned to the space thus produced.

As shown in FIGS. 5 and 8, the returning mechanism is provided in operative relation to the upward and downward travel of the lifter 50.

More specifically, a mounting plate 133 projecting from the under face of the lifter 50 is provided with a support 134 to which are pivoted U-shaped guide plates 135 positioned at front and rear portions of the lifter 50 respectively. A roller 136 supported at one end of each of the guide plates is kept in rolling contact with an upright cam rod 137 extending from the bottom plate of the frame 20, the rolling contact being effected by a spring 138 fixed at its one end to the bottom plate of the frame and acting on the guide plate 135. At the other end of each of the guide plates 135, there is formed a slanting face 139 for guiding the film sheet 41 into the insertion space in the cassette 32.

The two guide plates 135 are connected together by two connecting rods 140 and adapted for a predetermined action in operative relation to the upward and downward movement of the lifter 50 while being guided by the cam rod 137. A stop plate 141 is further provided for the side face of the cassette 32. The stop plate 141 is brought into contact with the side face of the cassette 32 as the lifter 50 is moved up so as to limit the movement of the guide plates 135.

The two guide plates 135 are further equipped with positioning plates 142 pivoted at the base portions thereof to the plates 135. Each of the positioning plates 142 has a guide member 144 at its upper end in facing relation to the slanting face 139 of the guide plate 135 to form a downwardly tapering passage 145 for guiding the film sheet 41 into the cassette 32. The guide member 144 is formed at its lower end with a flange 146 to be positioned immediately above the cassette 32 as the lifter 50 is moved upward and to be engaged with one side of a row of metal margins 42 of the film sheets 41 in the cassette 32 so as to push the film sheets 41 toward one side of the cassette 32 and to thereby form a space for the insertion of the film sheet 41 to be returned into the cassette 32. Between the guide plate 135 and the positioning plate 142 there is provided a spring 147 which acts to enlarge the passage 145. The position of the positioning plate 142 is determined by a stopper 148.

When the holder 111 is returned to the initial delivery position for the delivery mechanism, the ends 113b of hooked portion of the holding plates 113 are positioned beneath the ends of the receivers 105 of the delivery mechanism, and the lifter 50 then resumes its upward travel. During upward travel, the lid 38 of the cassette 32 is opened and the guide plates 135 are pivotally moved counterclockwise about the pivot 134 in FIG. 8, with the roller 136 in rolling contact with the cam face of the cam rod 137, with the result that the lower ends of the slanting faces 139 are located above one side of the cassette 32. At the same time, the flanges 146 of the positioning plates hit one side of a row of the metal margin upwardly projecting from the opening of the cassette 32 to push the film sheets 41 in the cassette 32 toward the other side and thereby form a space at one side of the cassette for inserting the film sheet 41 on the holder 111.

Due to a further upward movement of the lifter 50, the under edge of the film sheet 41 on the holder 111 is positioned in the passage 145 defined by the slanting faces 139 and the guide members 144, and as the lifter moves upward, the film sheet begins to move into the space in the cassette 32.

As the lifter approaches the terminal position of its elevation, the receivers 105 of the delivery mechanism are moved about the pivots 104 in such directions as to be retracted from the delivery position as indicated by an arrow b in FIG. 16, so that the hooked ends 113b of the holding plates 113 of the holder 111 are pushed down by the distal ends 105b of the receivers 105 to rotate about the pivots 112 as indicated by the arrow b' in FIG. 16. As a result, the hooked portions 113a are disengaged from the ears 42a of the metal margin 42, permitting the film sheet 41 to drop into the space in the cassette 32 under gravity.

As already described, the lifter 50 slows down under the action of the groove cam 83 of the lifting member 84 as it approaches the terminal of its upward travel until it comes to a halt upon actuating the microswitch 80, whereupon the threaded rod 79 is driven in the reverse direction to lower the lifter 50. During the downward movement, the receivers 105 are returned to the position of FIG. 16, with the holding plates 113 also returned to the position of FIG. 16 under the action of the springs 114. Since the roller 136 is in rolling contact with the cam rod 137, the guide plates 135 are brought back to the position of FIG. 8 to permit the guide passage 145 to be retracted from above the cassette 32, and the roller 71 on the lid opening and closing lever 69 which is in rolling contact with the cam plate 72 enables the lid 38 of the cassette 32 to close. Subsequently, the lifter 50 completes its downward travel.

Needless to say, the pin or roller 49 is disengaged from the vertical groove 52 of the box 51 during the upward travel of the lifter 50 and is engaged into the groove 52 during the downward travel thereof.

Upon completion of the downward movement of the lifter 50, the door 28 is released from the aforementioned locking mechanism and the lamp 27 turns on. Accordingly, opening of the door 28 permits the box 51 to be drawn out from the front and the cassette 32 can then be taken out.

It will be apparent from the foregoing description that, a great number of the film sheets 41 may be arranged in random manner in the cassette 32 insofar as the V-shaped notches 42d and notches 42e formed in the metal margins 42 are in alignment respectively. Thus the notches 42d, 42e serve to position the film sheets 41 always in correct arrangement.

The cassette 32 may bear on its surface a number or mark indicating the classification of the film sheets or may be formed with a hole or groove substituting therefor.

It will be apparent from the foregoing description that with the retrieval projection apparatus of this invention, the retrieval mechanism can be built in a small space at one side of the frame 20. When the main switch 24 is turned on, the pilot lamp is lighted to indicate that retrieval projection can be performed. The door 28 is opened to correctly place a cassette 32 containing the desired record in the box 51 on the lifter 50 and the door is then closed. The sheet selecting button 22 and frame selecting button 23 are depressed in accordance with the code of the desired record and the forward button 26 is then depressed, whereby the door 28 is kept locked and the indicating lamp 27 remains in the off state until the respective operations of selection, projection and returning are completed. At first, the lifting mechanism operates to elevate the lifter 50. During the upward movement, the lid 38 of the cassette 32 is opened. The lifter 50 comes to a halt accurately at the uppermost position of elevation, with shock absorbing effect achieved. At the same time, the retrieval mechanism 33 attracts the desired film sheet 41 in accordance with the instruction of the sheet selecting button 22 and pulls out the same from the cassette when the lifter 50 is lowered. During the downward movement, the lifter 50 closes the lid 38 of the cassette 32. The retrieval mechanism 33 permits the selected film sheet 41 to be transferred onto the positioning mechanism 34 by way of the delivery mechanism. The positioning mechanism sets the desired frame 41a on the projector 35 in accordance with the frame selecting button 23 for the projection of the image.

Subsequently, the positioning mechanism 34 is returned to the original position. The lifting mechanism resumes its operation to elevate the lifter 50 and permits the returning mechanism to return the film sheet 41 from the positioning mechanism to the cassette 32. Upon completion of the downward travel of the lifter 50, the lamp 27 is turned on and the door is freed from locking.

As will be apparent from the above description, the lifter 50 performs vertical reciprocating movement twice before the respective movements of selection, projection and returning are completed. Accordingly, the constituent members of the lid opening and closing mechanism, delivery mechanism and returning mechanism will be operated twice in operative relation to the reciprocation of the lifter 50. However, such operations will not cause any trouble to the foregoing operations of selection, projection and returning.

In this way, the present invention provides a retrieval projection apparatus wherein selection, projection and returning of the film sheet can be effected fully automatically simply by depression of the operating buttons.

What is claimed is:

1. In a retrieval projector wherein a film sheet having the desired record is selected and drawn out from among a great number of film sheets placed in a cassette and the record is enlarged and projected, a retrieval apparatus comprising, a cassette in the form of a rectangular box having a hinged lid and containing a great number of film sheets in random arrangement, each of said film sheets having a metal margin fixed to the upper edge of said film sheet, the ears at the opposite ends of the metal margin being supported on the upper edges of said boxlike cassette, said metal margin being formed along its upper edge with an edge to be attracted by a selecting and drawing out electromagnet, a suitable number of notches serving as a selecting code peculiar to each film sheet and positioning and holding notches for the holder of a frame selecting and positioning mechanism, a door for opening and closing an opening for loading said cassette on said retrieval projector, a lifter disposed inside said door and having a box slidable in operative relation to the opening and closing of said door for carrying said cassette at a predetermined position, said lifter being liftable to a given level by a lifting mechanism, said lifting mechanism being initiated into rotation in a normal direction in response to a sheet selection instructing signal emitted upon depression of a push button and a signal emitted upon depression of a forward button, said lifting mechanism being driven in the reverse direction when said lifter reaches the uppermost position in operative relation thereto and brought to a halt at the terminal position of downward travel of said lifter, a retrieving mechanism including a suitable number of selector plates shiftable to a position corresponding to the selection code of the desired film sheet in response to the sheet selection instructing signal while preventing the other film sheets from being drawn out, an electromagnet for attracting and drawing out the metal margin of the film sheet selected by said selector plates at the uppermost position of the elevated lifter, and clamp means for temporarily holding the film sheet drawn out of said cassette upon said lifter being moved downward, a delivery mechanism to be retracted in operative relation to the upward movement of said lifter for receiving the film sheet from said retrieving mechanism in operative relation to the downward movement of said lifter and pushing and transferring the film sheet onto a holder of a positioning mechanism, a positioning mechanism to be controlled by a frame selection instructing signal emitted by depression of a push button for controlled vertical and horizontal movement so as to set the desired frame of the film sheet on said holder to the projecting position and to be returned to the delivery position by the signal emitted by the depression of the forward button, and a returning mechanism to be operated in operative relation to the upward and downward movement of said lifter for pushing the film sheets in said cassettes toward one side of said cassette during the upward movement, guiding the film sheet on said holder of said positioning mechanism into an insertion space thereby formed in said cassette and returning the film sheet into said cassette.

2. The retrieval apparatus as set forth in claim 1 wherein said door is provided on its opposite sides with extendible plates extending into the main frame of the apparatus, said extendible plates being pivoted to a lower portion of the frame inside the cassette loading opening, pins or rollers on said extendible plates being engaged in vertical grooves having open lower ends and formed in the opposite sides of said box slidably mounted on said lifter, said box being movable toward or away from the opening in operative relation to the opening and closing of said door.

3. The retrieval apparatus as set forth in claim 1 wherein said door is provided on its opposite sides with extendible plates extending into the main frame of the apparatus, said extendible plates being pivoted to a lower portion of the frame inside the cassette loading opening, pins or rollers on said extendible plates being engaged in slots in levers each pivoted at its one end to the bottom of the frame, pins or rollers on the distal ends of said levers being engaged in vertical grooves having open lower ends and formed in the opposite sides of said box slidably mounted on said lifter, said box being movable toward or away from the opening in operative relation to the opening and closing of said door.

4. The retrieval apparatus as set forth in claim 1 wherein said door is provided on its opposite sides with extendible plates extending into the main frame of the apparatus, said extendible plates being pivoted to a lower portion of the frame inside the cassette loading opening, and a stepped rod slidable in its axial direction by electromagnetic means extends transversely at the lower portion inside the loading opening, said extendible plate being formed at its under edge with an open groove engageable with a small diameter portion of said stepped rod, said extendible plate further being formed with a hole communicating with the upper end of the groove and engageable with a large diameter portion of said stepped rod, said stepped rod being so arranged that when said door is opened or closed the small diameter portion of said stepped rod can engage into said open groove, said stepped rod being movable by said electromagnetic means when it is operated after said door is closed and at the latest upon depression of a code selecting push button so as to cause the large diameter portion to engage in said hole to thereby lock said door, said stepped rod being returned to the original position to unlock said door by said electromagnetic means being restored to the original state upon the downward movement of said lifter after the completion of projection.

5. The retrieval apparatus as set forth in claim 1 wherein the cassette carrying box slidably mounted on said lifter is provided with means for identifying the front or rear of said cassette coacting with a stopper on said box for determining the position of said cassette, said means comprising a recess formed in the rear face of said cassette and a projection formed on the inner face of said box and engageable in said recess.

6. The retrieval apparatus as set forth in claim 1 wherein said lifter is provided with an L-shaped lever having one end thereof pivoted to the rear side of said lifter and a distal end formed with an elongated groove engageable with a pin on the rear face of lid of said cassette, said lever having a bent portion carrying a roller or pin in rolling contact with a cam plate fixed to the frame of the apparatus, said lever being moved pivotally by said cam plate during the upward and downward movement of said lifter so that the lid is opened during the upward movement of said lifter and the lid is closed during the downward movement thereof.

7. The retrieval apparatus as set forth in claim 1 wherein said lifting mechanism comprises code selecting push buttons, a threaded rod formed with a helicoid of a large pitch and to be driven by drive means driven in a normal direction when actuated upon depression of the forward button, a lifting member having a circumferential cam groove and screwed on said threaded rod, a stop ring defining the terminal position of upward movement of said lifting member, a switch to be actuated by said lifting member when it is at the uppermost position for reversing the rotation of said drive means, a roller extending from the side face of said lifter and engaged in said cam groove, and an arm to be brought into frictional contact with the upper face of said lifting member when said roller is positioned on the lower portion of said cam groove to thereby prevent the rotation of said lifting member, whereby before said lifter reaches its uppermost position after said lifting member has reached its uppermost position the speed of upward movement of said lifter is reduced by virtue of the slope of said groove cam so as to mitigate the inertia of said lifter when it stops from upward movement.

8. The retrieval apparatus as set forth in claim 1 wherein said retrieving mechanism comprises a pair of clamp plates having a width corresponding to the lateral width of said cassette and having hooked lower ends engageable with the ears of said metal margin and electromagnetic means for electromagnetically operating said clamp plates so as to bring the same to a position where said clamp plates are engageable with the ears before the electromagnet for attracting said metal margin is de-energized, said electromagnetic means being de-energized to retract said clamp plates from the metal margin clamping position to free said metal margin from clamping action when said lifter is initiated into downward movement.

9. The retrieval apparatus as set forth in claim 1 wherein said delivery mechanism comprises receivers having a width corresponding to the lateral width of said cassette and fixed to a pair of pivots transversely extending below said clamp means and pushing plates slidable on said receivers widthwise thereof for pushing the metal margin of the film sheet on said receivers toward the holder of said positioning mechanism, said receivers being retracted from the film sheet supporting position in operative relation to the upward movement of said lifter and shifted to the film sheet supporting position in operative relation to the downward movement of said lifter, said pushing plates being moved away from said holder in operative relation to the upward movement of said lifter and moved toward said holder in operative relation to the downward movement of said lifter.

10. The retrieval apparatus as set forth in claim 1 wherein the holder of said positioning mechanism is provided on its side face directed toward said delivery mechanism with a pair of holding plates having upper hooked portions engageable with the opposite ears of the metal margin of the film sheet and a pair of levers having projections engageable with the positioning notch and holding notch in the metal margin and rings fitted on the projections and to be in resilient contact with the metal margin of the film sheet, said holding plates having their hooked portions urged upward, the ends of the hooked portions being so arranged as to be positioned beneath the ends of the receivers of said delivery mechanism at the delivery position, said levers having said projections urged downward, said projections having tapered ends, whereby the metal margin is to be held on each pair of the hooked portions and projections in engagement therewith.

11. The retrieval apparatus as set forth in claim 1 wherein said positioning mechanism comprises a vertically movable block to be driven in a vertical direction a distance corresponding to a vertical travel instructing signal for selecting a frame emitted upon depression of said push button, a horizontally movable block to be driven in a horizontal direction a distance corresponding to a horizontal travel instructing signal, a positioning block mounted on the intersection of movable members provided for said movable blocks respectively, said positioning block thus being rendered movable under the control of movements of said respective movable blocks, and said holder secured to said positioning block, whereby a frame of the film sheet having the desired record is set to the projecting position by depressing said frame selecting push button, said holder being returned from the projecting position to the delivery position by the signal emitted upon depression of said forward button.

12. The retrieval apparatus as set forth in claim 1 wherein said returning mechanism for the film sheet comprises guide plates pivoted to said lifter and each having an upper end formed with a slanting face for guiding the film sheet and the other end in contact with a cam secured to the frame of the apparatus and positioning plates pivoted at their base portions to said guide plates and having at their upper portions guide members opposing said slanting faces with a downwardly converging film sheet guiding passage formed therebetween, said positioning plates being formed at the lower end of said guide members with flanges engageable with one side of a row of metal margins of film sheets placed in said cassette, said guide plates and said positioning plates being guided by said cam during the upward movement of said lifter to permit said flanges to push the row of said metal margins toward one side of said cassette thereby forming a space for inserting the film sheet into said cassette and to permit said guide passage to position above said space thus formed so as to guide the film sheet on said holder along said slanting faces into said cassette, said guide plates and said positioning plates being guided by said cam during the downward movement of said lifter to retract said flanges and said guide passage sidewisely of said cassette.

* * * * *

UNITED STATES PATENT OFFICE
CERTIFICATE OF CORRECTION

Patent No. 3,754,817                  Dated August 28, 1973

Inventor(s)  TAKEO IIDA ET AL.

It is certified that error appears in the above-identified patent and that said Letters Patent are hereby corrected as shown below:

-- 30  Foreign Application Priority Data

November 17, 1970............45-101648 --

Signed and sealed this 20th day of November 1973.

(SEAL)
Attest:

EDWARD M. FLETCHER, JR.                RENE D. TEGTMEYER
Attesting Officer                      Acting Commissioner of Patents